US007877366B2

(12) United States Patent
Wang et al.

(10) Patent No.: US 7,877,366 B2
(45) Date of Patent: Jan. 25, 2011

(54) STREAMING XML DATA RETRIEVAL USING XPATH

(75) Inventors: Jinyu Wang, Fremont, CA (US); Mark Vincent Scardina, San Francisco, CA (US); Kongyi Zhou, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 238 days.

(21) Appl. No.: 11/080,794

(22) Filed: Mar. 14, 2005

(65) Prior Publication Data
US 2005/0203957 A1    Sep. 15, 2005

Related U.S. Application Data

(60) Provisional application No. 60/552,954, filed on Mar. 12, 2004.

(51) Int. Cl.
| G06F 7/00 | (2006.01) |
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |

(52) U.S. Cl. ........................... 707/702; 715/234
(58) Field of Classification Search ................ 707/702; 715/234

See application file for complete search history.

(56) References Cited

U.S. PATENT DOCUMENTS

| 5,539,909 | A  | * | 7/1996  | Tanaka et al. ............... 719/315 |
| 6,643,650 | B1 | * | 11/2003 | Slaughter et al. ............. 707/10 |
| 6,772,216 | B1 | * | 8/2004  | Ankireddipally et al. .... 709/230 |
| 6,880,125 | B2 | * | 4/2005  | Fry ............................ 715/234 |
| 6,898,604 | B1 | * | 5/2005  | Ballinger et al. ............ 707/101 |
| 7,162,502 | B2 | * | 1/2007  | Suarez et al. ............... 707/203 |
| 7,296,017 | B2 | * | 11/2007 | Larcheveque et al. .......... 707/6 |
| 2002/0087596 | A1 | * | 7/2002 | Lewontin .................... 707/513 |
| 2003/0023628 | A1 | * | 1/2003 | Girardot et al. ............ 707/513 |
| 2004/0034830 | A1 | * | 2/2004 | Fuchs et al. ............... 715/501.1 |
| 2004/0167864 | A1 | * | 8/2004 | Wang et al. .................... 707/1 |
| 2004/0172599 | A1 | * | 9/2004 | Calahan ..................... 715/513 |
| 2004/0261008 | A1 | * | 12/2004 | Pepin et al. ................. 715/500 |

(Continued)

OTHER PUBLICATIONS

Michael Kay, Saxon: the Xpath API, Feb. 10, 2003, pp. 1-8.*

(Continued)

*Primary Examiner*—James Trujillo
*Assistant Examiner*—Jeffrey Burke
(74) *Attorney, Agent, or Firm*—Hickman Palermo Truong & Becker LLP

(57) ABSTRACT

An XML Extractor that extracts XML data from streamed input based on registered XPaths is provided. XPaths and associated content handlers instances are registered at runtime with the XML Extractor. The XML Extractor receives streaming input that represents XML data at a stream-based parser, and evaluates the received input against the registered XPaths expression. In response to detecting that the received streaming input includes an XPath that matches a registered XPath expression, the XML Extractor generates output to the content handler associated with the matching registered XPath expression.

26 Claims, 8 Drawing Sheets

U.S. PATENT DOCUMENTS

| | | | |
|---|---|---|---|
| 2005/0038688 A1* | 2/2005 | Collins et al. | 705/9 |
| 2005/0049924 A1* | 3/2005 | DeBettencourt et al. | 705/21 |
| 2005/0055631 A1* | 3/2005 | Scardina et al. | 715/513 |
| 2005/0060372 A1* | 3/2005 | DeBettencourt et al. | 709/206 |
| 2005/0097579 A1* | 5/2005 | Dorn et al. | 719/330 |

OTHER PUBLICATIONS

Charles Reitzel, We Need an Xpath API, Mar. 5, 2001, pp. 1-5.*

Elliot Rusty Harold, An Introduction to StAX [online], Sep. 9, 2003, 8 pages, [retrieved on Mar. 15, 2005]. Retrieved from the internet: <URL: http://www.xml.com/lpt/a/2003/09/17/stax.html>.

David Megginson, SAX [online], 9 pages, [retrieved Mar. 3, 2005]. Retrieved from the internet; <URL: http://www.saxproject.org/quickstart.html>.

Jinyu Wang and Mark Scardina, XML Data Streaming for Enterprise Applications Using PL/SQL and SAX, Apr. 3, 2002, 11 pages.

W3C, XQuery 1.0 and XPath 2.0 Data Model W3C Working Draft 12 Nov. 2003 [online] Copyright 2003, Nov. 12, 2003, 72 pages [retrieved on Jun. 22, 2004]. Retrieved for the internet: <http://www.w3.org/TR/2003/WD-xpath-datamodel-20031112/.

* cited by examiner

STREAMING XML DATA RETRIEVAL USING XPATH

CROSS REFERENCE TO RELATED APPLICATION

This application claims the benefit of priority to U.S. Provisional Patent Application No. 60/552,954 filed on Mar. 12, 2004, entitled "STREAMING XML DATA RETRIEVAL USING XPATH," which is incorporated by reference in its entirety for all purposes as if fully set forth herein.

FIELD OF THE INVENTION

The present invention relates generally to XML processing and, more specifically, efficiently parsing XML documents with XPath support.

BACKGROUND OF THE INVENTION

XML (EXtensible Markup Language) is rapidly becoming a widely-used industry standard for exchanging business data. Various interfaces have been developed for applications to parse and access XML data when XML documents are received. Efficient parsing of XML documents is becoming more important as the size and volume of XML documents increases.

An XML parser takes as input a raw serialized string and performs certain operations on it. Typically, a parser checks the syntactic well-formedness of the XML data, e.g. making sure that the start tags have matching end tags, and that there are no overlapping elements. Some parsers also implement validation against a Document Type Definition (DTD) or the XML schema to verify the structure and content. The parsing output provides access to the content of the XML document via programmatic application programming interfaces (APIs).

One specific type of parser that has been developed is a Document Object Model (DOM) parser. A DOM parser uses a tree-based parsing technique that builds a parse object tree in memory. It allows complete, dynamic access to an entire XML document through an object-oriented API. Because the XML document is represented in memory as an object tree, DOM parsers preserve and allow dynamic access to the XML document structure and content. A DOM parser is capable of supporting XPath, a preferred technique for selecting and retrieving data from XML documents. XPath allows for retrieval of XML data based not only on its content, but also on the XML document structure.

However, as XML documents become increasingly large, current solutions for parsing XML documents based on DOM parser tree creation and traversal face serious performance issues. Significantly, known DOM parsing solutions require an entire XML document to be parsed at one time, as partial parsing is not possible. In addition, loading the entire document and building the tree structure in memory is computationally expensive, especially for larger documents. In practice, DOM trees have required up to 10 times the memory of the original document. DOM parsers do not perform or scale well when processing large XML documents because of their high memory cost.

In addition, current DOM-based XML data retrieval techniques redundantly traverse the DOM tree when processing multiple XPath expressions. This is not efficient, especially for a large XML document with hundreds of XPath expressions. The redundancy can result in scalability issues for a system in which many large XML documents are processed.

"Streaming" refers to techniques for transferring data such that the data can be processed as a steady and continuous stream, and is an ideal solution for efficiently retrieving data from large documents. A streaming protocol that can handle large documents allows for fast processing as well as scalability.

Streaming-based XML processing techniques that use a fixed amount of memory, such as SAX (Simple API for XML) and StAX (Streaming API for XML), have been developed. SAX and StAX parsers require less memory than DOM parsers, but they do not maintain the hierarchical structure of XML documents. That is, while known SAX and StAX parsers allow pieces of XML documents to be accessed, the structure is lost in the processing. Without the document structure, known SAX and StaX parsers cannot support XPath-based XML data retrieval.

The ability to perform XPath-based XML data retrieval can be very important in certain situations. For example, in an industry in which a very large number of documents are handled, such as a news organization, for example, some users may only be interested in a portion of the XML data found in an XML document. Support for XPath-based data retrieval is needed to be able to selectively retrieve XML data of interest.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is depicted by way of example, and not by way of limitation, in the figures of the accompanying drawings and in which like reference numerals refer to similar elements and in which.

DETAILED DESCRIPTION OF EMBODIMENTS OF THE INVENTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview of Parsing APIs

In general, there are two types of XML parsing APIs—tree-based parsing APIs and event-based parsing APIs.

Tree-Based Parsing APIs

A tree-based parsing API maps an XML document into an internal tree structure, then allows an application to navigate that tree. The most widely used tree-based parsing API is the Document Object Model (DOM), a standard from the World-Wide Web Consortium (W3C). Each node of a DOM parser tree represents a particular piece of data from the original XML document. By representing an XML document in memory as an object tree, DOM parsers preserve and allow dynamic access to the XML document structure and content.

In order to create the tree, however, the entire XML document must be read into memory. An object in the DOM object tree must be created for each node in an XML document. DOM APIs can only be used after the entire XML document has been completely parsed. A DOM parser therefore does not perform or scale well when processing large XML documents because of its high memory costs.

Figure 1:
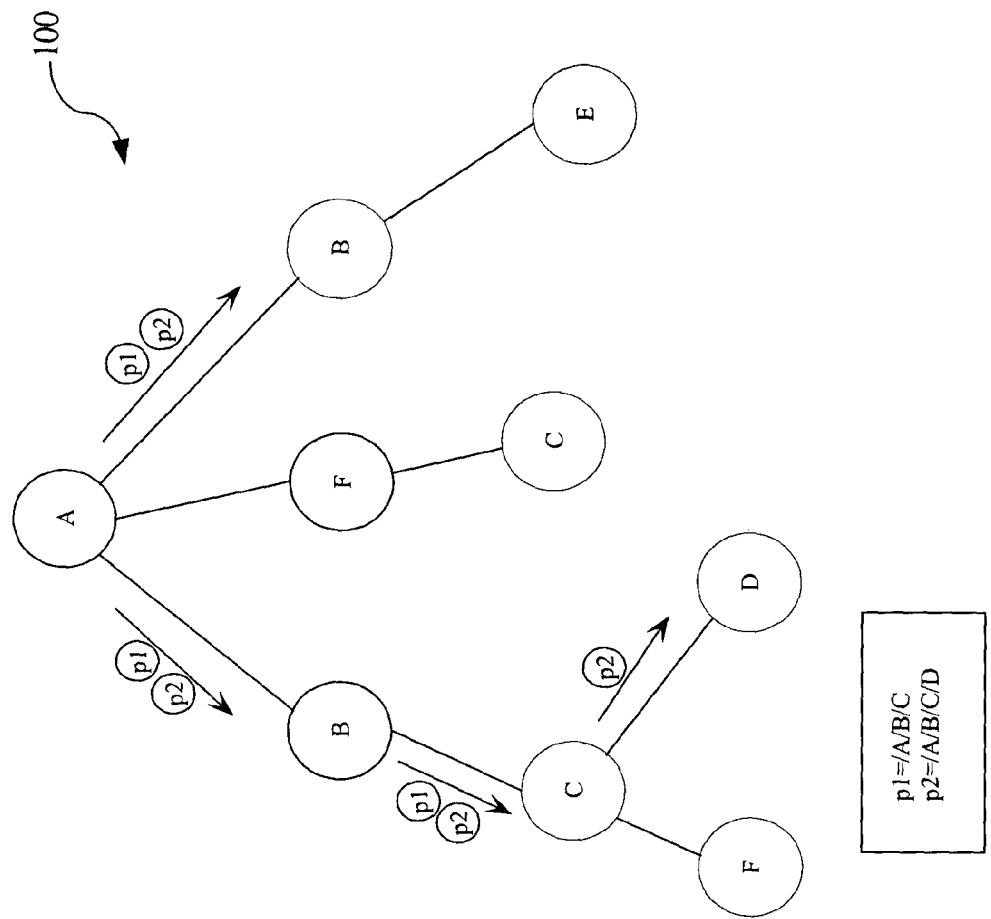
FIG. 1 is a block diagram that illustrates an example of a parse tree created by a DOM parser.

In addition, DOM-based XML data retrieval redundantly traverses the DOM tree when processing multiple XPath expressions. An example of DOM tree that can result in redundant traversals is shown as DOM tree 100 in FIG. 1. Suppose two XPath expressions (p1 and p2) are used to retrieve data—where the first XPath expression p1 is /A/B/C and the second XPath expression is /A/B/C/D. As shown by arrows with a "p1" label, when evaluating p1, the DOM parser will select the A element, then iterate its children selecting all the B elements under A. After all the B elements are selected, then all the C elements under B are selected and evaluated. To evaluate p2, the exact same process is performed. Nothing is learned from processing p1. As shown by the processing arrows labeled with both "p1" and "p2" in DOM tree 100, A, B and C elements are all processed twice. This inefficiency can greatly impact performance when processing large XML documents, resulting in scalability issues when deployed in situations which require heavy XML document processing.

As discussed below, techniques disclosed herein avoid unnecessary traversals when processing multiple XPaths, and efficiently handle hundreds of XPaths per document.

Event-Based Parsing APIs

Instead of building a tree representation of an entire XML document in memory, a streaming event-based parser generates a series of events as it reads through an XML document. An "event" as used by a streaming XML parser is a string of characters that is recognized as a chunk of XML syntax. For example, SAX events may include start document, start element, end element, and character events, among others.

Streaming parsers offer great performance benefits because the entire document does not need to be loaded into memory at one time, which enables a streaming parser to parse a document larger than the system memory. Likewise, streaming parsers are typically faster than DOM parsers as they can start generating output from the input almost immediately, without waiting for the entire document to be read. In addition, unlike DOM parser, objects do not need to be created for each node. Streaming parsers provide efficient low-level access to the content of an XML document.

A streaming event-based parser API reports events that occur as the parser is parsing through an XML document directly to the application. In an event-based parser that "pushes" events, such as SAX, events are pushed to event or "content" handlers. Programmers can create handlers to perform any function desired upon receiving an event.

When a SAX parser reads input XML data, the event handler is the mechanism by which XML data "events" are accessed by an application. An event handler class for a SAX parser provides the callback methods that deal with start element events, end element events, character events, etc. for all elements. SAX parsers push out events in a broadcast fashion, and event handlers receive events in parallel, further increasing processing efficiency.

Table 1 illustrates an example XML document (Books.xml) that will be used herein to describe SAX parser processing.

TABLE 1

| | Books.xml |
|---|---|
| 1 | <catalog> |
| 2 | <book> |
| 3 | <title>See Spot Run</title> |
| 4 | <author>Jane Doe</author> |
| 5 | <price>9.95</price> |
| 6 | </book> |
| 7 | <book id> |
| 8 | <title>Dogs running</title> |
| 9 | <author>Harold Miller</author> |
| 10 | <price>21.00</price> |
| 11 | </book> |
| 12 | </catalog> |

A SAX parser parsing an XML document arriving in a stream will break the document into a series of linear events, in the order they are encountered in the document, and push each event to an appropriate event handler for that event while processing the document. The SAX events generated in the example Books.xml document will include:

start document
start element: catalog
start element: book
start element: title
characters: See Spot Run
end element: title
start element: author
characters: Jane Doe
end element: author
start element: price
. . .

A SAX parser outputs events that include data as well as an indicator as to metadata about that data. For example, as shown above, a start element event is output as well as the character string associated with that start element. A start element event handler will process the start element events, and an end element event handler will process the end element events, and so forth. An application using a SAX API will provide event handlers for all of the types of XML data events that a SAX parser will generate. These event handlers can be customized to a great degree, however, the code that is required to provide any degree of customization may be quite complex.

Once an element has been seen by a SAX parser, typically its state is discarded. Only information at the current point of the document is available during parsing. For example, the SAX parser will generate an event when the title element "See Spot Run" is encountered. However, it is not possible for an application receiving the title element event to tell if this "title" element is part of a catalog or part of a collection, for example. That is, the title element could be a child of a catalog element or it could be the child of a collection element. The only information available to the application is that it is a "title" element. If any kind of state information is needed by an application, then the application must store and manage state information itself because the parser just spits out stream text in the order it is encountered in the document without regard to where it belongs in the document structure hierarchy. Structure information inherent in the document is lost during SAX parsing. This limitation may be significant in situations in which random access to XML data is desired.

Applications that use the SAX API to parse XML documents have control over what happens when XML events occur, and can customize the parsing process extensively. Although the SAX API is relatively simple, the code application developers need to write to handle events received through the SAX API is not, and while an application can be written to track and handle states for a particular input document, such customization is very laborious and difficult to maintain.

A StAX parser also represents XML data as a set of events. However, StAX uses a push model instead of a pull model for event processing. Instead of using a callback mechanism to receive event information, a StAX parser returns events as requested by the application, and may even provide the events as objects. For example, a StAX API may give parsing control to the programmer by exposing a simple iterator-based API and an underlying stream of events. The API may include such methods as next( ) and hasNext( ) that allows programmers to ask for the next event rather than handle specific events with a callback functions.

With a StAX API, the application controls when and where the parser is called. That is, the application, not the parser, controls the process. In addition, the StAX API is a bi-directional API for reading and writing XML.

Because of their limited memory use, the stream-based SAX and StAX XML parsers can both efficiently retrieve data from large XML documents. SAX is a preferred stream-based parser when multiple XPath evaluations are required, as the broadcasted SAX events can be leveraged to multitask within the XML parsing process. However, as mentioned above, neither SAX nor StAX parsers maintain the hierarchical structure of XML documents, and they both thus lack XPath support.

Functional Overview of Embodiments of XML Extractor

Embodiments of a stream-based XML Extractor that extracts XML data into datasets using XPath are disclosed herein. The disclosed XML Extractor incorporates a streaming parser to parse an XML document, and extracts XML data into datasets using XPath during stream processing. Example embodiments of the XML Extractor disclosed herein use a SAX parser as the streaming parser, as SAX parsers support multitasking such that an application can perform other tasks while processing large documents. A SAX parser generates and handles standard XML events, while the XML Extractor generates and handles XPath events. By using SAX parsing techniques, memory usage is managed independently of document size. However, a SAX parser is not required, and a StAX parser, or any other streaming parser that generates an indication of the contents of the document being parsed, can be used by the XML Extractor instead.

Embodiments of an XML Extractor comprise one or more sequences of instructions which, when executed by one or more physical processors, cause the physical processors to perform particular actions. Embodiments of the XML Extractor can execute on any suitable computer hardware platform, such as computer system 200 of FIG. 2.

Figure 3A:
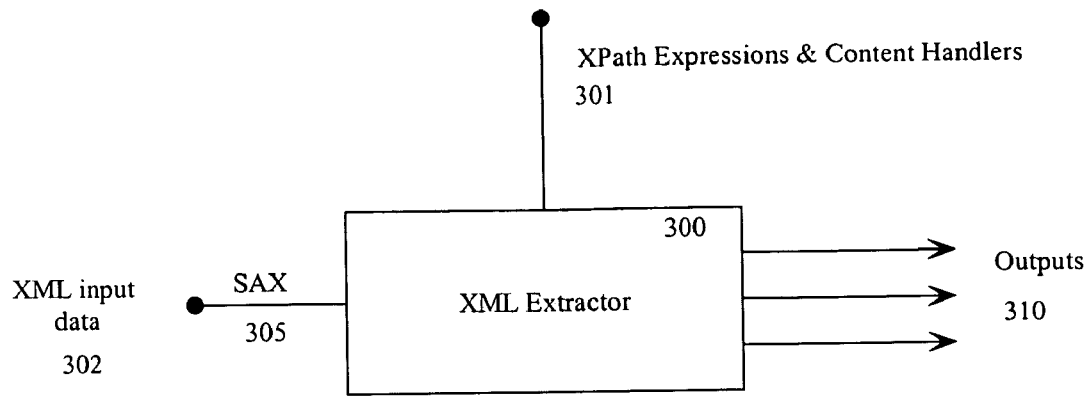
FIG. 3A is a block diagram that illustrates a subcribe/publish processing model for an XML extractor, according to an embodiment.

FIG. 3A illustrates the basic processing model of an "XML Extractor" 300 according to one embodiment. In this processing model, all XPath expressions of interest to an application or user, and their related XPath content handlers, are registered 301 with the XML Extractor as subscribers. The XML Extractor 300 processes input XML data stream 302 using a SAX parser 305, and publishes 310 the extracted data through the registered XPath content handlers. XML input stream 302 is typically one or more XML documents or messages or, more generally, any information encoded using XML which is streamed as input to the XML Extractor 300. This publish/subscribe processing model allows for efficient data dissemination with multiple receiving ends.

Figure 3B:
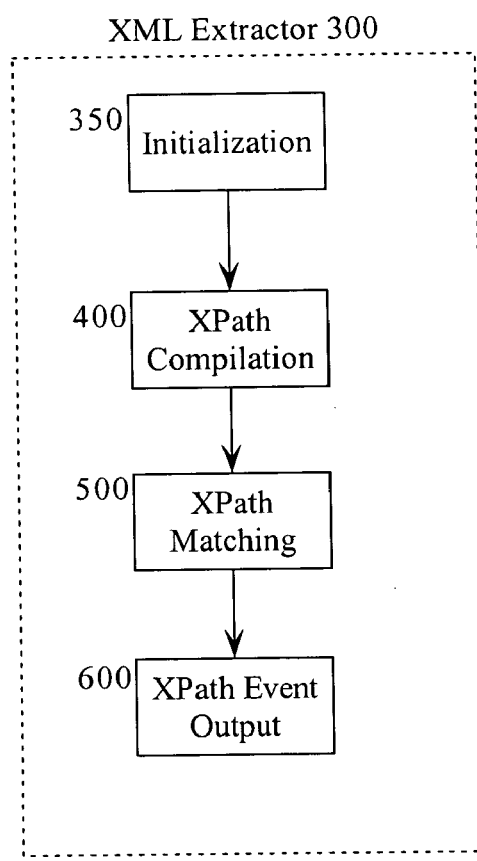
FIG. 3B is a block diagram that illustrates functional processing components of one embodiment of an XML extractor.

FIG. 3B illustrates the basic functional processes performed by one embodiment of XML Extractor 300. At block 350, the XML Extractor is initialized when XPaths of interest and their corresponding content handlers are registered. At block 400, the registered XPaths are compiled and indexed. At block 500, the XML Extractor maintains XPath states, and matches XPaths received in the XML data input stream with indexed XPaths. At block 600, events reporting start and end of registered XPath matches in the input stream, along with SAX events reporting the XML data, are sent to subscribers through registered content handlers. Each functional process is described in more detail below.

XML Extractor Initialization

XPath and Content Handler Registration

The XML Extractor requires subscribers to register XPath expressions and corresponding instances of specialized event handlers, herein called "XPath content handlers", in order to receive extracted XML data matching the corresponding XPath expressions. To receive the retrieved XML data, each registered XPath must be associated with a content handler instance that implements an interface in the initialization process. Several types of content handler interfaces can be used, and will be discussed in more detail below. In order to uniquely identify each XPath, the XML Extractor assigns a unique identifier (ID) to each registered XPath expression during initialization. This ID is used to determine the associated content handler when the XPath expression is encountered during stream parsing. During the streaming process, the XML Extractor will determine which, if any, portions of incoming XML data satisfy the registered XPaths, and performs actions specified by corresponding XPath content handlers.

Significantly, instead of customizing applications to handle particular XML data, XPaths and content handlers are registered during runtime. An XML Extractor is not customized for any particular type of XML input. Subscribers to the XML Extractor register XPaths and content handlers, thereby allowing the XML Extractor to provide XPath data retrieval support for any type of input XML data.

While shown as an initialization process in FIG. 3B, XPaths and content handlers can be registered at any time, and registrations can be updated at any time.

Initializing XML Extractor with a DTD or XML Schema

In one embodiment, an XML schema or DTD may also be used in the initialization process, and used to describe the structure of input XML data or documents. However, while helpful to ensure that an XML document is valid, a schema or DTD is not required. A schema or DTD gives advance notice to the XML Extractor as to what types of XPaths are associated with an XML document, and what XPaths are valid for a document.

A user must have some knowledge of the data model in order to write valid XPath expressions for registration. In one embodiment, a user can use an application that visually displays a DTD or schema to select XPaths for registration. In one embodiment, a user may manually enter registration information based on a DTD or schema. In one embodiment, an application may register XPaths based on information obtained from a DTD or schema, while the schema itself is not actually provided to the XML Extractor during initialization.

Namespaces and Predicates

In one embodiment, each registered XPath conforms to an XPath standard that supports XML namespaces. In particular, XML documents can include one default un-prefixed namespace, and many prefixed namespaces. As the XML Extractor uses a streaming parser to process the document, relative XPaths that use unprefixed namespaces can produce unexpected results as they depend on a context that does not usually exist in this model. Therefore, in one embodiment, all registered XPath expressions should be absolute with no relative context.

In one embodiment, the registration process supports namespace prefixes and URIs. A name-value pair registration format of <namespace prefix>, <namespace-uri> is preferably used to specify namespaces. For example, ("my", "http://www.foo.com/xml")

can be specified. Once namespaces are specified, XPaths can be registered using the specified namespaces. For example, an XPath expression for extracting the shipping address from purchase order (PO) documents that uses the above-defined namespace could be registered as:

/my:PO/Shipping_Address

In one embodiment, XPaths registered with the XML Extractor can also include predicates. For example, the following XPath could be registered to extract all the line items in a PO where the name of the person in the billing address is "John Smith."

/PO/LineItems/Item[../../Billing_Address/To/text()= "John Smith"]

Execution Options

Within the initialization process, the XML Extractor may also acquire options or preferences that specify execution behavior. For example, the XML Extractor may use an option to limit the processing to XPath 1.0, 2.0 or both, to anticipate further functions and data bindings.

In SAX XML processing, a "streamable" XPath cannot include any forward references (children or descendents). When a forward reference (child or descendent) is included in an registered XPath, the XML Extractor cannot determine a match for the XPath at the time it receives the XML data. That is, the XML Extractor cannot determine whether to dispatch XML data events to XML data content handlers or not.

In one embodiment, all registered XPaths are required to be streamable in order to be extracted and processed. However, it may be possible to perform some level of document buffering in order to support non-streamable XPaths by preserving XML data in memory for later resolution. In such an embodiment, registered XPaths are not required to be streamable.

In one embodiment, an XML Extractor can receive an option during initialization that specifies whether registered XPath expressions are required to be streamable or not. For example, a boolean flag "isAll" set to "false" may be used to indicate the XML Extractor will not buffer any data internally when tracking and evaluating XPath expressions. In this case, the XML Extractor may simply reject any non-streamable XPaths in the registration process. Alternatively, the XML Extractor may generate an error. Setting isAll to "false" may be useful for an application that requires scalable data extraction with a limited range of XPath patterns.

The isAll flag may be set to "true" to indicate that the XML data should be buffered in order to later resolve the XPaths with forward references. Although the performance and scalability may suffer because of buffering, this may be preferable in cases in which the XML Extractor is required to process all kinds of XPath expressions in order to integrate with an XQuery or XSQL engine, for example. Even though performance and scalability may be diminished when buffering for non-streamable XPaths is performed, because a DOM tree is not built in memory, it is still more efficient than DOM parsers.

Many various execution options can be used to configure the XML Extractor during initialization, and options are not limited to those discussed here.

XPath Compilation

As discussed above, FIG. 1 illustrates how a DOM tree 100 is redundantly traversed for XPaths with common elements. In order to allow for more efficient (i.e. less redundant) traversal of an XPath tree, one embodiment of the XML Extractor compiles (e.g. consolidates) registered XPaths before processing streamed input data. In one embodiment, an XPath compilation process 400 translates and builds an "XPath dependency tree" for all registered XPaths. In another embodiment, XPath compilation process 400 builds an annotated metadata tree for all XPaths in an associated DTD or schema. Annotated metadata trees and XPath dependency trees are discussed in detail herein.

Although shown as a process component in FIG. 3B, compilation process 400 is not required in all embodiments of the XML Extractor. In addition, although described using the example of building annotated metadata trees and XPath dependency trees, other methods of compilation or consolidation may be used. For example, both metadata trees and XPath dependency trees discussed herein are top-down models of XML data. A bottom-up model could alternatively be used.

Location Paths and Predicates

One embodiment of the XPath compilation process first splits an XPath into its location path and predicate component parts, as these will be processed differently. The location paths will be further compiled into an XPath dependency tree or an annotated metadata tree that reflects the fact that SAX events will occur in document order, and is normalized to eliminate redundant matching of common path steps.

Each XPath predicate is compiled into a predicate dependency table that is linked to its associated compiled location path.

Predicate Dependency Table

Figure 4:
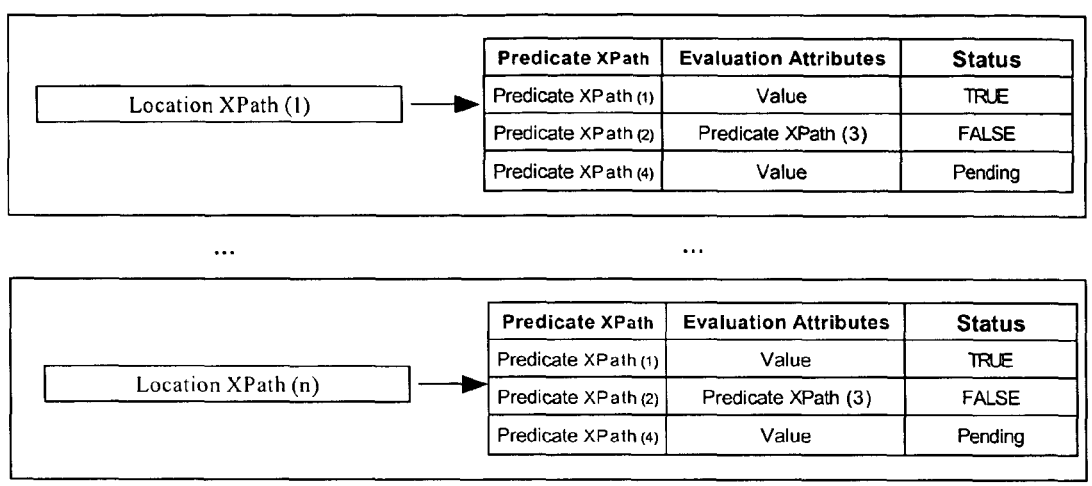
FIG. 4 is a block diagram illustrating an example of a predicate dependency table.

FIG. 4 illustrates one embodiment of a predicate dependency table, however many various table formats can be used to track to location path and predicate relationships. In the embodiment shown in FIG. 4, a predicate dependency table contains its own set of location path expressions related with a value or reference to another location XPath. These paths may contain either forward (children) or backward (parent) references. For backward references, all the data may be preserved in a hash table for later reference. For forward references, depending on the "isAll" option discussed above, the XML Extractor may hold data in memory until the XPath expression can be evaluated. In this case, the status of the dependency is tracked in the predicate dependency table, and may be set as a yet-to-be-matched state so that when predicate values are later available, an action for re-evaluating the location XPath can be triggered.

Any type of table, or other data structure, can be used to track predicate dependencies and resolve forward references in XPaths, and a dependency table as shown in FIG. 4 is not specifically required.

Annotated Metadata Tree

When an XML Extractor is initialized with a DTD or schema, an annotated metadata tree may be built. This tree utilizes the data model defined by the DTD or XML schema. Because a DTD or schema includes all valid location paths that could be received, it is possible to use the tree to quickly determine whether a particular received XPath expression is included in the tree, even for a relative XPath expression.

For example, the metadata tree can be used to speed up the output of XPath expressions such as //C, as the XML Extractor will look up a set of possible location Paths defined in the data model. If there are no possible location Paths in the metadata tree, then it is not possible that the received XPath is a match to a registered XPath, no matter whether it has a predicate or not.

The metadata tree is annotated to indicate when a location path node corresponds to the location path of a registered XPath. In one embodiment, the nodes in the metadata tree that indicate when registered XPaths are satisfied are annotated with XPath IDs associated with those registered XPaths.

Figure 6:
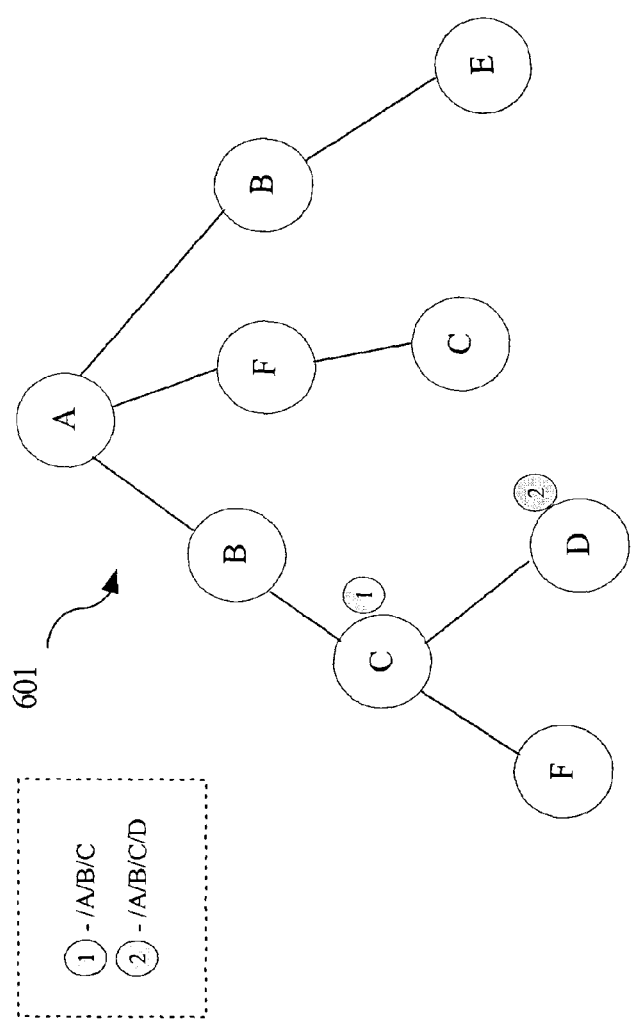
FIG. 6 is a data model diagram that illustrates an annotated metadata treel.

FIG. 6 illustrates an example annotated metadata tree 601 built from a DTD, and in which the XPaths /A/B/C and /A/B/C/D have been registered with the XML Extractor. As shown, the nodes that correspond to the registered XPaths have been annotated with an identifier of the associated registered XPath. This metadata tree is traversed at runtime, and when an XPath matching an annotated node is reached, the content handler associated with the registered XPath identified by the annotation is called. Of course, if the registered XPath includes any predicates, these are evaluated before calling the content handler.

XPath Dependency Tree

When an XML Extractor is initialized without a DTD or schema, an XPath dependency tree based on registered Xpaths may be built. This tree is compiled and built from location paths of registered XPaths. In one embodiment, an XPath dependency tree uses a special "fake node" to represent // or /* in an XPath expression. This tree is optimized for stream-based XPath extraction, and annotated with the processing actions and the match of the registered XPath so that potential match traversal lookups are optimized. For example, /A/B/C/D, /A/B/C/E, and /A/B/C can be collapsed in an XPath dependency tree.

Figure 5A:
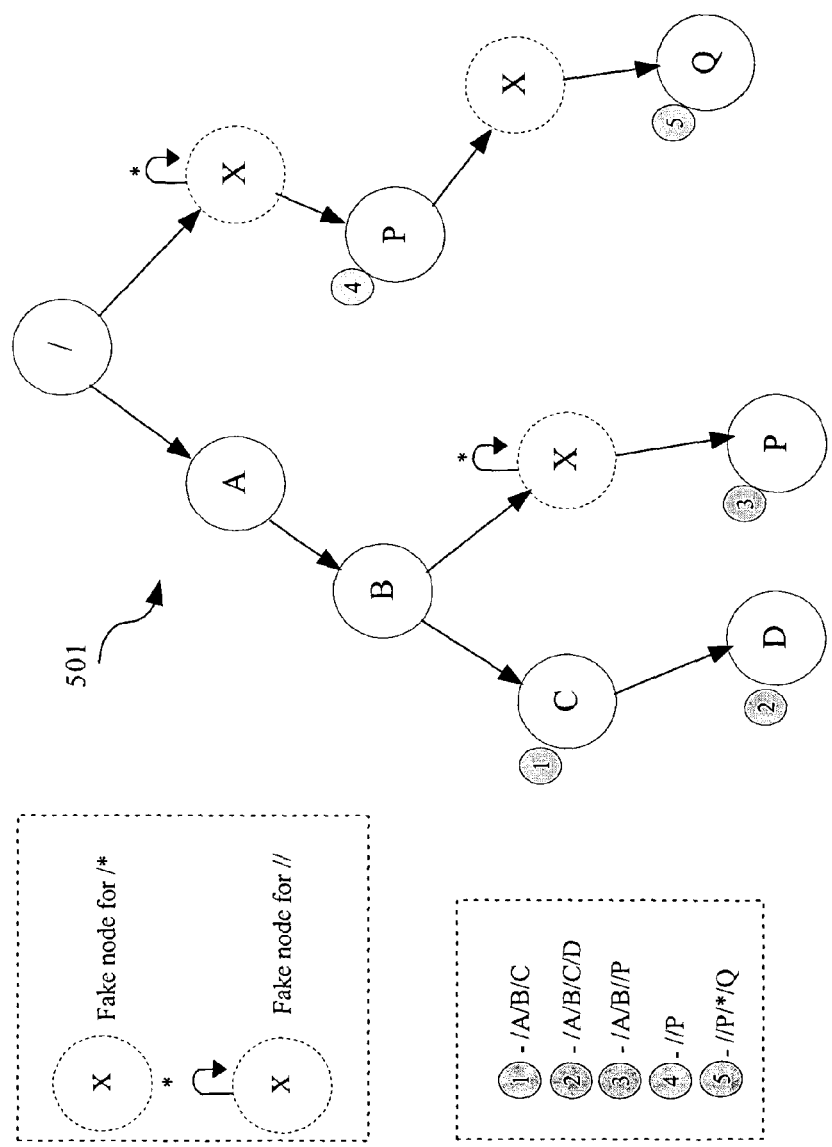
FIG. 5A is a block diagram that illustrates an XPath dependency tree.

FIG. 5A illustrates an example XPath dependency tree built for the registered XPath expressions:
(1) /A/B/C
(2) /A/B/C/D
(3) /A/B//P
(4) //P
(5) //P/*/Q As shown, the tree is annotated with registered XPath expression IDs (i.e. shaded circles 1-5), and XPaths 1 and 2 have been collapsed to avoid redundant potential match lookup traversals.

XPath Matching

In order to be able to match XPaths received in the input XML data stream with registered XPaths, the context of SAX XML events must be tracked and maintained through the parsing process. In one embodiment, a finite state machine is used to track current XPath semantics. In one embodiment, a state machine automaton is built to track and maintain the hierarchical relationships between XML elements and attributes during stream parsing. The state machine maintains the state and progress of the parsing process. Each state in the automaton reflects the current XPath context in the input XML data, with SAX events triggering state transitions.

In one embodiment, current XPaths, as determined by the state machine, are matched against XPaths in the XPath dependency tree built from registered XPath expressions or the metadata tree built from the DTD or schema annotated with registered XPaths is traversed synchronously with parsing the XML document. The XPath dependency tree or the annotated metadata tree is traversed synchronously with the state machine to find matching registered XPaths.

The XML Extractor will call an XPath content handler when it received an XPath that matches a registered XPath, and it has ensured that it has the data for it, but only when data is ready to send to the content handler. As discussed above, when the "isAll" flag is set to "true" such that forward references will be resolved, the XML Extractor holds XML data in memory until is can successfully evaluate the XPath. To minimize memory use, a table can be created to record all SAX events in order to send out the data after all the predicates are evaluated. A similar process is used to fill in the predicate table when it includes forward references to SAX events that have not yet occurred. Once the table is complete, the value can be sent out.

Annotated Metadata Tree

When an XML Extractor is initialized with a DTD or schema, and an annotated metadata tree is built, the tree may be traversed synchronously with the parsing of the XML document to perform XPath matching. During the traversal, the annotations on the annotated metadata tree are retrieved and evaluated to determine whether there is an XPath match.

For example, as shown in FIG. 6, when metadata tree 601 is traversed to the node that matches XPath 1 (/A/B/C), then the XPath is determined to be a match. If the matched XPath or the input path includes any predicates, this is analyzed using the predicate dependency table to further determine is the XPath matches before invoking the associated content handler.

XPath Dependency Tree

In one embodiment, the XPath state machine automaton used to store streaming XPath context can be implemented as a stack. In this embodiment, the stack may store the following information:
  inscope namespaces
  name of current element
  attribute of current element
  position of node relative to its siblings
  number of its child elements
  current stack level Based on information in the stack, a set of XPath expressions are treated as the current XPath. The current XPath is then matched against the tree built during the XPath compilation process. Any predicates evaluated to befalse in the predicate dependency table cause the XPath to be removed from the tracking list.

Figure 5B:
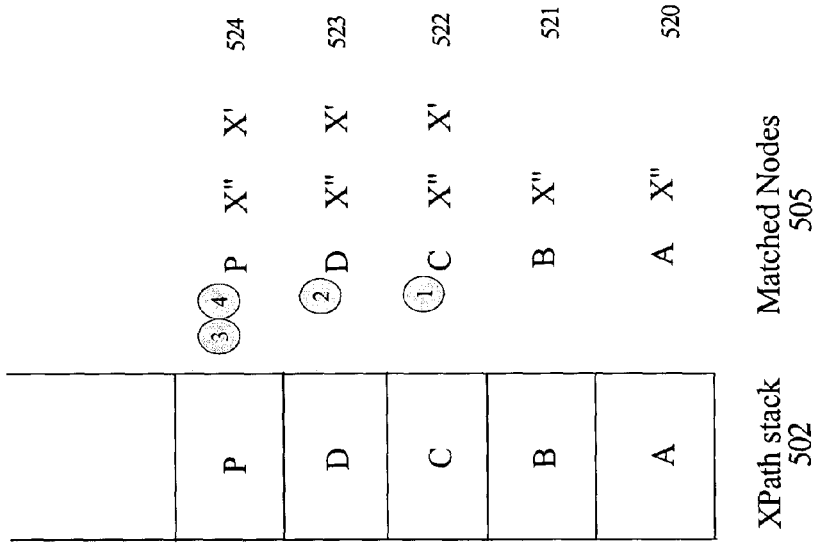
FIG. 5B illustrates a stack used to implement the XPath dependency tree of FIG. 5A.
Figure 5B:
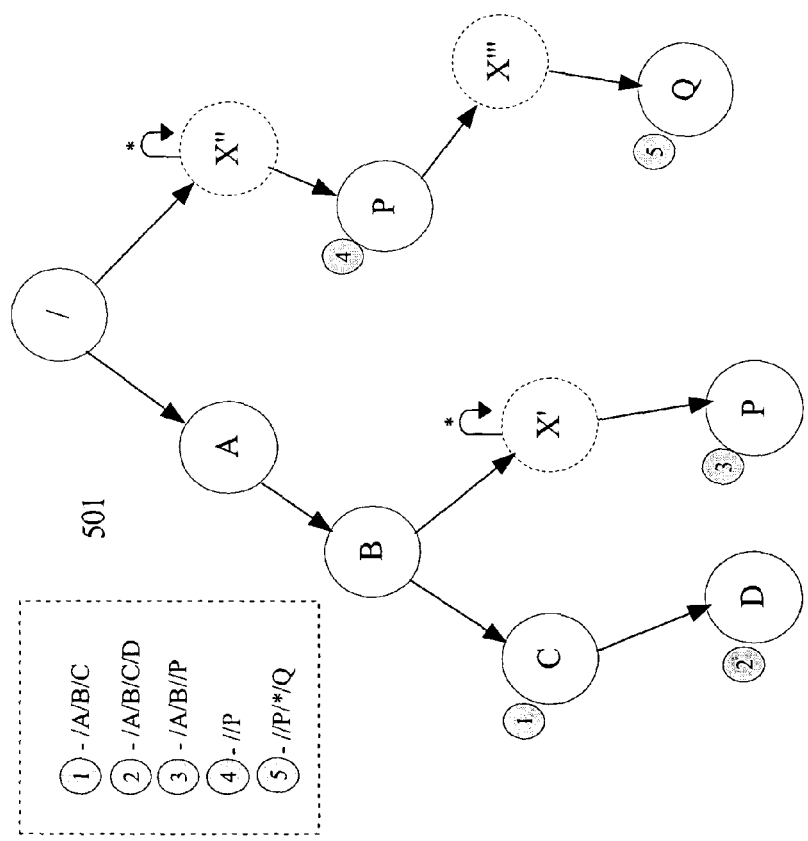

FIG. 5B illustrates the XPath dependency tree of FIG. 5A being traversed as XML events occur during stream parsing. An XPath dependency tree traversal provides a list of possible node matches and any registered XPath matches.

Suppose the first element encountered in the stream is "/A". The stack 502 contains only "A" at the point, and when tree 501 is traversed with "/A", nodes A and X" are matches, as indicated by match list 520. Neither of these nodes have been marked as a registered XPath, so processing continues.

Supposed Element "B" is encountered next. The XPath stack at this point comprises A at the bottom, with B above A.

Synchronously traversing dependency tree 501 for "/A/B" results in matches with nodes B and X", as shown by match list 521. Element "C" is encountered next. When dependency tree 501 is traversed for "/A/B/C", as indicated by the state machine or XPath stack, nodes C, X' and X" are matches, as shown by match list 522. Node C has been marked as a registered XPath expression, as indicated by the state mark in match list 522. The current XPath—/A/B/C, as maintained by the state machine or XPath stack, is considered to be a matching XPath—the registered XPath with the ID of 1. If the dependency table indicates that any predicates are associated with this registered XPath, these are evaluated before calling the content handler associated with registered XPath 1.

Suppose that element D is next encountered in the stream. At this point, matching nodes on the XPath dependency tree include nodes D, X" and X', as indicated by match list 523. Node D is also associated with a registered XPath—the XPath with the ID of 2. Again, if the XML Extractor is implemented with a dependency table, the table is checked and evaluated before invoking the associated content handler.

Suppose that element P is encountered next. The state machine now contains the XPath "/A/B/C/D/P", as reflected in XPath state stack 502. Matching nodes in XPath dependency tree 501 now include nodes P, X" and X'. Two registered XPaths are associated with this XPath expression, XPaths 3 and 4.

XML Extractor Outputs

Content handlers, which are functions or methods containing program statements that are executed in response to an event, are registered with associated XPaths. When the "event" of extracting the associated XPath from the input data stream occurs, the content handler is invoked, and output is pipelined into stream-based XML processing applications. Generally, data output from the XML Extractor can be in the form of (1) a set of events, (2) XML Sequence Objects and/or (3) XML files.

Set of Events Output

In one embodiment, the events that can potentially be reported include all standard SAX events (e.g. start element, end element), with two additional events signifying the registered XPath match. A startXPath event reports the start of a registered XPath match by referring to the ID for the XPath. An endXPath event reports the end of the registered XPath match, and also refers to the XPath ID.

In this embodiment, an application can register its own handlers. In one embodiment, the registered content handlers implement the XContentHandler interface used by the XML Extractor.

XML Sequence Objects

In one embodiment, built-in handlers include "XMLSequenceBuilder", which processes the events sent by the XML Extractor and represents the result set as an XML Sequence object. To receive retrieved XML data as XML Sequence objects, registered XPaths are associated with content handler instances that implement the XMLSequenceBuilder interface.

The XML Sequence object is an object defined in XPath 2.0 data model representing the result set of XPath evaluations. XMLSequenceBuilder content handlers are useful in embodiments of the XML Extractor that are integrated with XQuery or XSLT engines.

In one embodiment, the XMLSequence content handler interface is defined as:

```
public interface XMLSequence {
    public boolean next( );
    public XMLItem GetCurrentItem( );
}
```

The XMLSequence object contains a list of XMLItems, which includes both the XML data and its datatype:

```
public interface XMLItem {
    public OXMLSequenceType getItemType( );
    public sting getLexicalValue( );
    public boolean getBoolean( );
    ...
    public XMLNode getNode( );
}
```

XML Files

In one embodiment another built-in handler is the XMLSerializer, which simplifies the use of the XML Extractor by creating a set of files for the extracted XML data set. To receive retrieved XML data, registered XPaths can be associated with a content handler instances that implements this interface.

Implementation Mechanisms

The approach for extracting datasets from streaming XML input based on registered XPath expressions, as described herein, may be implemented in a variety of ways and the invention is not limited to any particular implementation. The approach may be integrated into a system or a device, or may be implemented as a stand-alone mechanism. Furthermore, the approach may be implemented in computer software, hardware, or a combination thereof.

Application Use Cases

The above-described XML Extractor can be advantageously integrated into a variety of applications to efficiently retrieve and disseminate XML data. Only a few of examples of use cases are described herein, and it will be apparent to those skilled in the art that many applications are possible.

Content Management

An embodiment of the XML Extractor can be integrated into a content management system, and used to extract XML data and metadata. The content management system can then insert the extracted data into relational database tables in a database.

In one embodiment, the XML data extraction is based on XPaths stored in an XPATH table. In one embodiment, the XPaths in the XPATH table are associated with a DTD or XML schema. An associated DTD may be determined by using the DTD's system ID and public ID from an input XML document. An associated XML schema may be determined using the XML Schema Location URL from an input XML document. Before initializing the XML Extractor, the content management application retrieves the DTD's system ID and public ID, or the XML Schema's Schema Location URL, from an input XML document.

In one embodiment, the XML Extractor is then initialized using the DTD or XML schema such that XPath compilation and tracking is optimized.

The DTD or XML schema is used by the content management application to query the XPATH table to obtain a list of XPaths. Each XPath in the list of XPaths is registered with the XML Extractor, along with specified instances of content handlers to receive the retrieved data.

When the input XML document is parsed by SAX, the XML Extractor retrieves the XML data for each registered XPath (i.e. each XPath in XPATH table), and disseminates the retrieved data to the corresponding registered content handlers. The content handlers are programmed to insert the extracted retrieved data into metadata and data tables in the database accordingly. That is, the XML Extractor uses a streaming parser to populate metadata and data tables in the database based on registered XPath information Use of the XML Extractor in the Content Management systems allows all of the XPaths to be processed within one traversal of the input XML document that uses SAX stream processing, resulting in high performance XML data retrieval that uses limited memory resources.

Web Services

Figure 7:
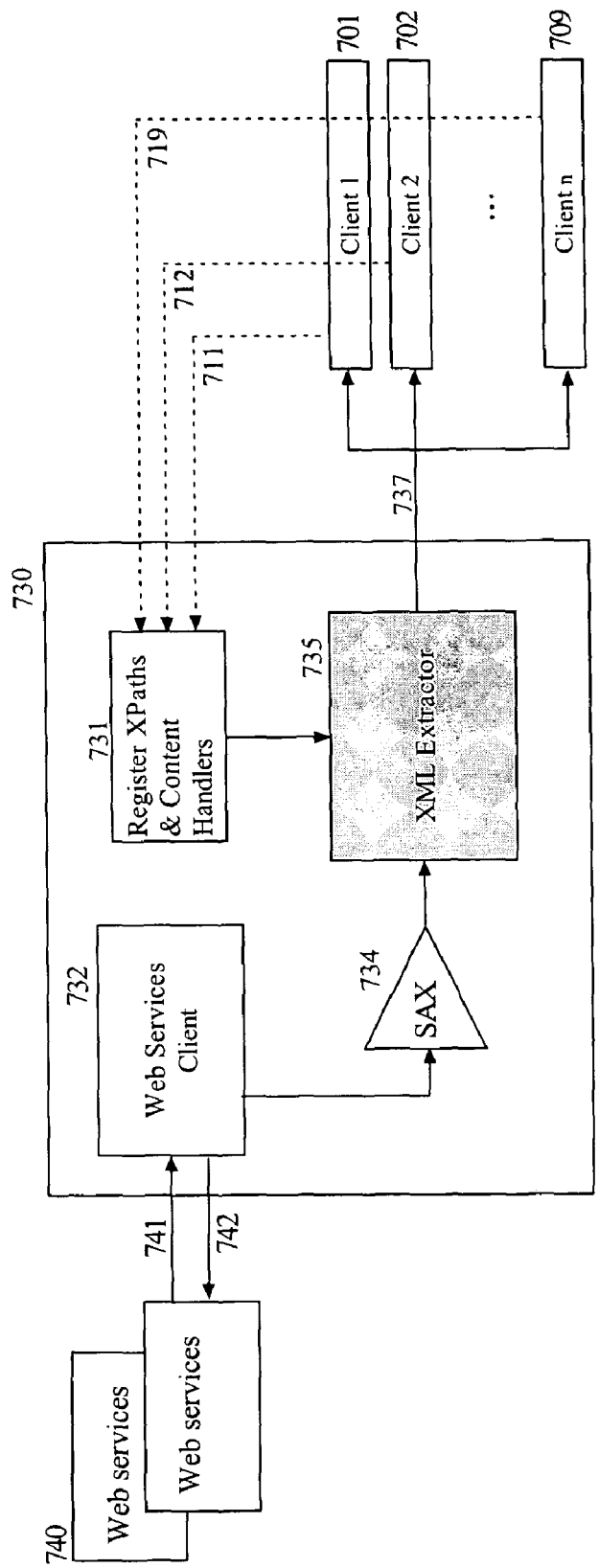
FIG. 7 is a diagram illustrating an embodiment of using an XML extractor in a web services application.

An embodiment of the XML Extractor can also integrate into Web service proxy servers or clients to extract data from Simple Object Access Protocol (SOAP) XML messages. Typically, clients of web services are only interested in a portion of the data that is sent by a web services application. In an embodiment of a web services system that uses an XML Extractor, subscribers can subscribe to data that is of interest by registering XPaths associated with the services of interest. In this embodiment, each subscriber will only receive the portion of the received XML data that is of interest to them, as indicated by registered XPaths. FIG. 7 illustrates one embodiment of a Web service application using an XML Extractor as a data router to selectively disseminate data to proper users.

In the Web service application illustrated in FIG. 7, subscribers use client applications (701, 702, 709) subscribe to data services provided by web services 740 by sending XPath expressions for registration (711, 712, 719) to service broker 730. The XML Extractor is initialized with registered XPaths 711, 712, 719.

Web service client 732 of service broker 730 invokes 742 web services 740 using SOAP. Web services responses are sent 741 back to the service broker 730, also in SOAP format. The SOAP messages are parsed by a SAX parser 734 and processed by XML Extractor 735, where data is extracted from the SOAP response messages and disseminated to each client based on their XPath-based service subscriptions. Each subscription (i.e. set of registered XPaths) may be different for each subscriber. In addition, each subscriber may register different content handlers for a common registered XPath. For example, a first subscriber may register an XPath /A/B with a content handler programmed to send XML data via email to the subscriber, while a second subscriber may register the XPath /A/B with a content handler programmed to create an XML file with the extracted XML data.

In the web services application shown in FIG. 7, the XML Extractor provides high-performance XML data extraction and allows Web service clients to share Web service responses. Round-trip traffic of Web services invocations over the Internet are accordingly reduced.

XQuery and XSLT Engines

XQuery and XSLT engines rely on XPath queries for execution. The current DOM-based XPath engines do not process large XML documents in an efficient manner, and suffer performance issues.

When an XQuery or XSLT engine is implemented using an embodiment of the XML Extractor, XPaths can be registered with the XLM Extractor. The retrieved data extracted from the input XML data can be output from the XML Extractor as XML Sequence objects defined in XPath 2.0.

Hardware Overview

Figure 2:
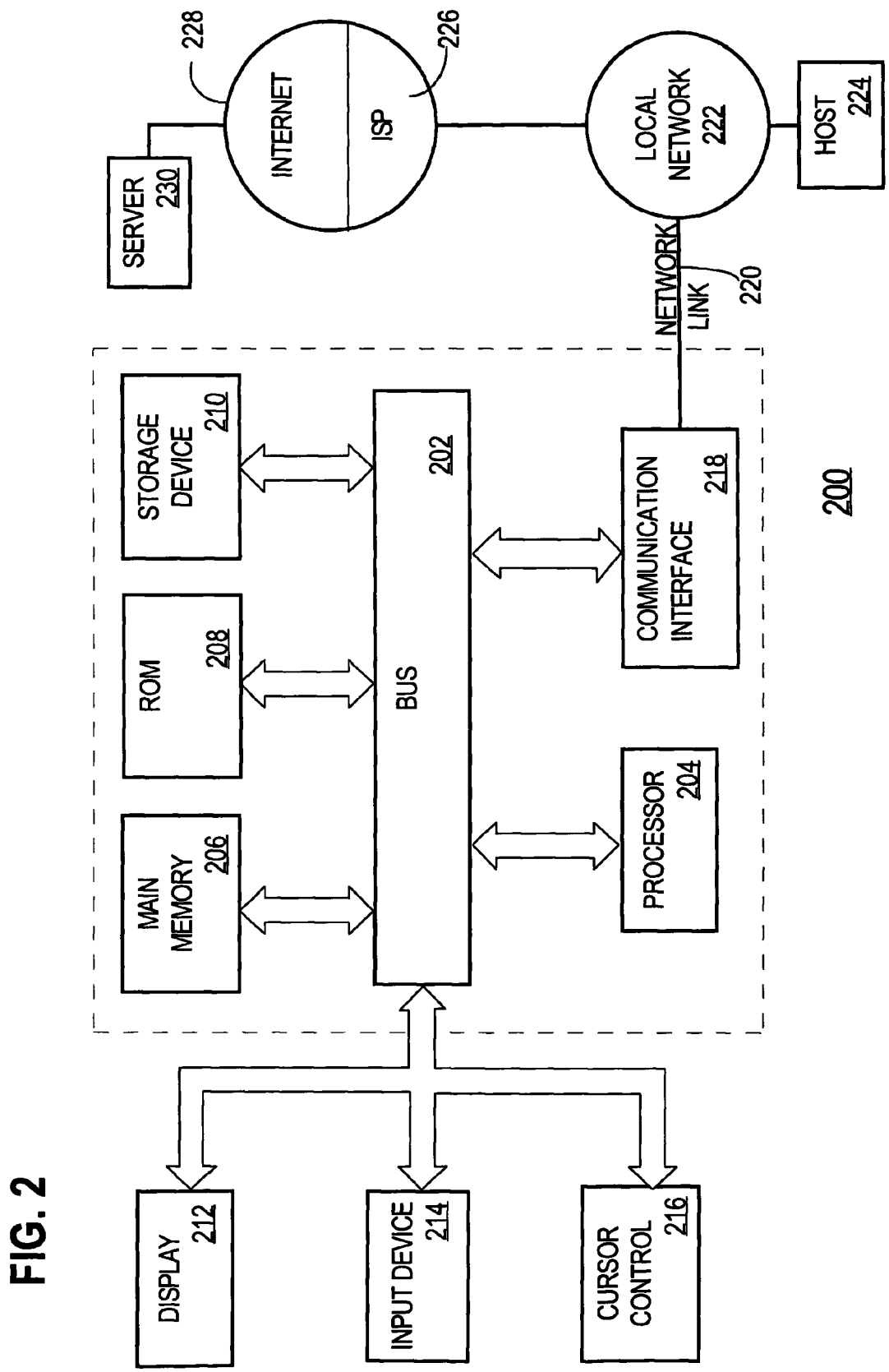
FIG. 2 is a block diagram that depicts a computer system 200 upon which an embodiment of the invention may be implemented.

FIG. 2 is a block diagram that depicts a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method comprising the computer-implemented steps of:

receiving streaming input that represents XML data at a stream-based parser;

said stream-based parser receiving at runtime, a set of XPaths and associated content handler instances for registration;

wherein each XPath of the set of registered XPaths is associated with a separate content handler of a plurality of content handlers that are registered with said stream-based parser;

evaluating events from the stream-based parser against the registered XPaths; and detecting whether received streaming input includes an XPath that matches a registered XPath;

in response to detecting that received streaming input includes an XPath that matches a registered XPath, reading registration information to identify a particular content handler instance that has been registered for said registered XPath, and calling said particular content handler instance;

wherein the steps of receiving, evaluating, and detecting are performed by one or more computing devices.

2. The method of claim 1, wherein the particular content handler instance implements an interface selected from the group consisting of XMLSerializer and XMLSequenceBuilder.

3. The method of claim 1, wherein the particular content handler instance implements an interface for reporting start of XPath events and end of XPath events.

4. The method of claim 1, wherein the step of receiving a set of XPaths and associated content handler instances for registration comprises receiving XPaths selected by a user that indicate XML data of interest in a web services application.

5. The method of claim 1, wherein said streaming input comprises an XML document.

6. The method of claim 1, wherein said streaming input comprises XML data from a web services application.

7. The method of claim 1, wherein said stream-based parser comprises a SAX parser.

8. The method of claim 1, wherein at least one XPath in the set of XPaths includes a location path and a predicate.

9. The method of claim 8, wherein said detecting that received streaming input includes an XPath that matches a registered XPath includes detecting that streaming input matches both the location path and the predicate of the at least one XPath.

10. The method of claim 1, additionally comprising the step of:

compiling registered XPaths into a tree that represents a structural hierarchy for the registered XPaths.

11. The method of claim 10, wherein the tree that represents a structural hierarchy is a XPath dependency tree that consolidates common elements of registered XPaths.

12. The method of claim 10, additionally comprising the step of:
   receiving a DTD or XML schema associated with the registered XPaths;
   wherein the tree that represents a structural hierarchy is a metadata tree representing the received DTD or schema, wherein nodes of said metadata tree matching registered XPaths are annotated with information about the associated registered XPath.

13. The method of claim 10, wherein the step of evaluating events from the stream-based parser against the registered XPaths comprises maintaining hierarchical relationships for received XML data in a state machine, and traversing the state machine synchronously with the tree.

14. A computer-readable storage medium storing one or more sequences of instructions which, when executed by one or more processors, causes the one or more processors to perform:
   receiving streaming input that represents XML data at a stream-based parser;
   said stream-based parser receiving at runtime, a set of XPaths and associated content handler instance for registration;
   wherein each XPath of the set of registered XPaths is associated with a separate content handler of a plurality of content handlers that are registered with said stream-based parser;
   evaluating events from the stream-based parser against the registered XPaths; and
   detecting whether received streaming input includes an XPath that matches a registered Xpath;
   in response to detecting that received streaming input includes an XPath that matches a registered XPath, reading registration information to identify a particular content handler instance that has been registered for said registered XPath, and calling said particular content handler instance.

15. The computer-readable storage medium of claim 14, wherein the particular content handler instance implements an interface selected from the group consisting of XMLSerializer and XMLSequenceBuilder.

16. The computer-readable storage medium of claim 14, wherein the particular content handler instance implements an interface for reporting start of XPath events and end of XPath events.

17. The computer-readable storage medium of claim 14, wherein the step of receiving a set of XPaths and associated content handler instances for registration comprises receiving XPaths selected by a user that indicate XML data of interest in a web services application.

18. The computer-readable storage medium of claim 14, wherein said streaming input comprises an XML document.

19. The computer-readable storage medium of claim 14, wherein said streaming input comprises XML data from a web services application.

20. The computer-readable storage medium of claim 14, wherein said stream-based parser comprises a SAX parser.

21. The computer-readable storage medium of claim 14, wherein at least one XPath in the set of XPaths includes a location path and a predicate.

22. The computer-readable storage medium of claim 21, wherein said detecting that received streaming input includes an XPath that matches a registered XPath includes detecting that streaming input matches both the location path and the predicate of the at least one XPath.

23. The computer-readable storage medium of claim 14, additionally comprising instructions which, when executed by the one or more processors, causes the one or more processors to perform:
   compiling registered XPaths into a tree that represents a structural hierarchy for the registered XPaths.

24. The computer-readable storage medium of claim 23, wherein the tree that represents a structural hierarchy is a XPath dependency tree that consolidates common elements of registered XPaths.

25. The computer-readable storage medium of claim 23, additionally comprising instructions which, when executed by the one or more processors, causes the one or more processors to perform:
   receiving a DTD or XML schema associated with the registered XPaths;
   wherein the tree that represents a structural hierarchy is a metadata tree representing the received DTD or schema, wherein nodes of said metadata tree matching registered XPaths are annotated with information about the associated registered XPath.

26. The computer-readable storage medium of claim 23, wherein the step of evaluating events from the stream-based parser against the registered XPaths comprises maintaining hierarchical relationships for received XML data in a state machine, and traversing the state machine synchronously with the tree.

* * * * *

UNITED STATES PATENT AND TRADEMARK OFFICE
CERTIFICATE OF CORRECTION

PATENT NO. : 7,877,366 B2
APPLICATION NO. : 11/080794
DATED : January 25, 2011
INVENTOR(S) : Wang et al.

Page 1 of 1

It is certified that error appears in the above-identified patent and that said Letters Patent is hereby corrected as shown below:

In column 1, line 21, delete "(EXtensible" and insert -- (eXtensible --, therefor.

In column 2, line 43, delete "subcribe/" and insert -- subscribe/ --, therefor.

In column 2, line 56, delete "treel;" and insert -- tree; --, therefor.

In column 7, line 11, delete "un-prefixed" and insert -- unprefixed --, therefor.

In column 10, line 19, delete "is" and insert -- it --, therefor.

In column 10, line 54, delete "befalse" and insert -- be false --, therefor.

In column 13, line 12, delete "information" and insert -- information. --, therefor.

In column 13, line 65, delete "XLM" and insert -- XML --, therefor.

Signed and Sealed this
Fourth Day of October, 2011

David J. Kappos
*Director of the United States Patent and Trademark Office*